(12) United States Patent
Li et al.

(10) Patent No.: US 9,757,003 B1
(45) Date of Patent: Sep. 12, 2017

(54) POWER SUPPLY DEVICE FOR ROBOT VACUUM CLEANERS

(71) Applicant: PRECASTER ENTERPRISES CO., LTD., Taichung (TW)

(72) Inventors: Nen-Tsua Li, Taichung (TW); Chen-Yu Liao, Taichung (TW)

(73) Assignee: Precaster Enterprises Co., Ltd., Taichung (TW)

( * ) Notice: Subject to any disclaimer, the term of this patent is extended or adjusted under 35 U.S.C. 154(b) by 0 days.

(21) Appl. No.: 15/271,237

(22) Filed: Sep. 21, 2016

(51) Int. Cl.
*A47L 9/28* (2006.01)
*A47L 11/40* (2006.01)

(52) U.S. Cl.
CPC ....... *A47L 11/4011* (2013.01); *A47L 11/4005* (2013.01); *A47L 9/2863* (2013.01); *A47L 2201/04* (2013.01)

(58) Field of Classification Search
CPC ............. A47L 2201/00; A47L 2201/04; A47L 9/2863; A47L 11/4011; A47L 11/4005; A47L 9/28
See application file for complete search history.

(56) References Cited

U.S. PATENT DOCUMENTS

2014/0222197 A1\* 8/2014 Letsky ................. A01D 34/008
700/245

\* cited by examiner

*Primary Examiner* — David Redding
(74) *Attorney, Agent, or Firm* — Rosenberg, Klein & Lee

(57) ABSTRACT

A power supply device for a rotary distance detection device of a robot vacuum cleaner includes a base having a control board which is electrically connected to a power supply so as to control the base to move. The control board has bearings and a distance-detection circuit board on the bearings. The distance-detection circuit board is electrically connected to the control board and the power supply via the bearings so that the robot vacuum cleaner is able to work continuously without worry of replacement of batteries.

5 Claims, 4 Drawing Sheets

POWER SUPPLY DEVICE FOR ROBOT VACUUM CLEANERS

BACKGROUND OF THE INVENTION

1. Fields of the Invention

The present invention relates to a robot vacuum cleaner, and more particularly, to a power supply device for a rotary distance detection device of a robot vacuum cleaner.

2. Descriptions of Related Art

There many different types of robot vacuum cleaners are developed and these robot vacuum cleaner provide convenience to clean the floor without using a manual vacuum cleaner. In order to perform specific features or cleaning methods, different brands of the robot vacuum cleaners have different settings to meet different tasks.

Generally, the robot vacuum cleaners have a base which is electrically connected to a control board and a rotary distance detection device, and a power supply supplies power to these parts. The control board has a receiving member, and the rotary distance detection device has a distance-detection circuit board which has an optical distance detection member and an emitting member on the top and the bottom thereof. The rotary distance detection device has a hole which is located corresponding to the receiving member. The optical distance detection member rotates on the rotary distance detection device, and emits beams to detect the distance between objects and the robot vacuum cleaner, the emitting member then sends the detected signals from the optical distance detection member to the receiving member of the control board via the hole. Therefore, the control board judges the distance between the objects and the robot vacuum cleaner based on the signals received, and decides the path that the robot vacuum cleaner moves.

However, the power supply to the distance-detection circuit board, the optical distance detection member and the emitting member cannot be provided by wires because the rotary distance detection device keeps on rotating and moving. If a battery is used as the main power source, the battery cannot provide stable and sufficient power to the robot vacuum cleaners. The replacement of the battery becomes inconvenience factor to the users.

The present invention intends to provide a power supply device for a rotary distance detection device of a robot vacuum cleaner to improve the shortcomings mentioned above.

SUMMARY OF THE INVENTION

The present invention relates to a power supply device for a rotary distance detection device of a robot vacuum cleaner, and comprises a base having a control board connected thereto which is electrically connected to a power supply. The control board has a receiving member, an axial bearing and a radial bearing on the top surface thereof. The axial bearing and the radial bearing are arranged as two rings, and the receiving member is located at the center of the axial bearing and the radial bearing. The axial bearing and the radial bearing are respectively connected to the positive pole and the negative pole of the power source.

A rotary distance detection device has a rotary member and a distance-detection circuit board, wherein the rotary member is connected to the axial and radial bearings. The rotary member has a hole which is located corresponding to the receiving member. The distance-detection circuit board is electrically connected to an optical detection device on the top surface of the distance-detection circuit board, and a emitting member on the bottom surface of the distance-detection circuit board. The distance-detection circuit board is connected to the top surface of the rotary member. The distance-detection circuit board is electrically connected to the axial bearing and the radial bearing so as to provide electric power to the optical detection device and the emitting member.

The optical detection device rotates on the rotary member and emits beams to obtain distance signals which are emitted by the emitting member through the hole and received by the receiving member. The control board controls the base to move based on the distance signals received by the receiving member.

Preferably, the axial bearing includes a top ring and a bottom ring, wherein multiple spiral springs are connected to the top surface of the axial bearing and the bottom surface of the radial bearing. The spiral springs respectively bias the control board and the distance-detection circuit board which is electrically connected to the power supply.

Preferably, the radial bearing has an inner ring and an outer ring for retaining bearing balls therebetween. The control board has multiple top bolts which are electrically connected to the inner ring or the outer ring of the radial bearing. The distance-detection circuit board is connected with multiple bottom bolts which are electrically connected to the inner ring or the outer ring of the radial bearing.

Preferably, the base includes a motor which is electrically connected to the power supply. The motor has a shaft which is cooperated with the belt which is wrapped to the outer periphery of the rotary member so as to drive the rotary member.

The primary object of the present invention is to provide a rotary distance detection device of a robot vacuum cleaner such that the frequent replacement of the batteries can be avoided.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
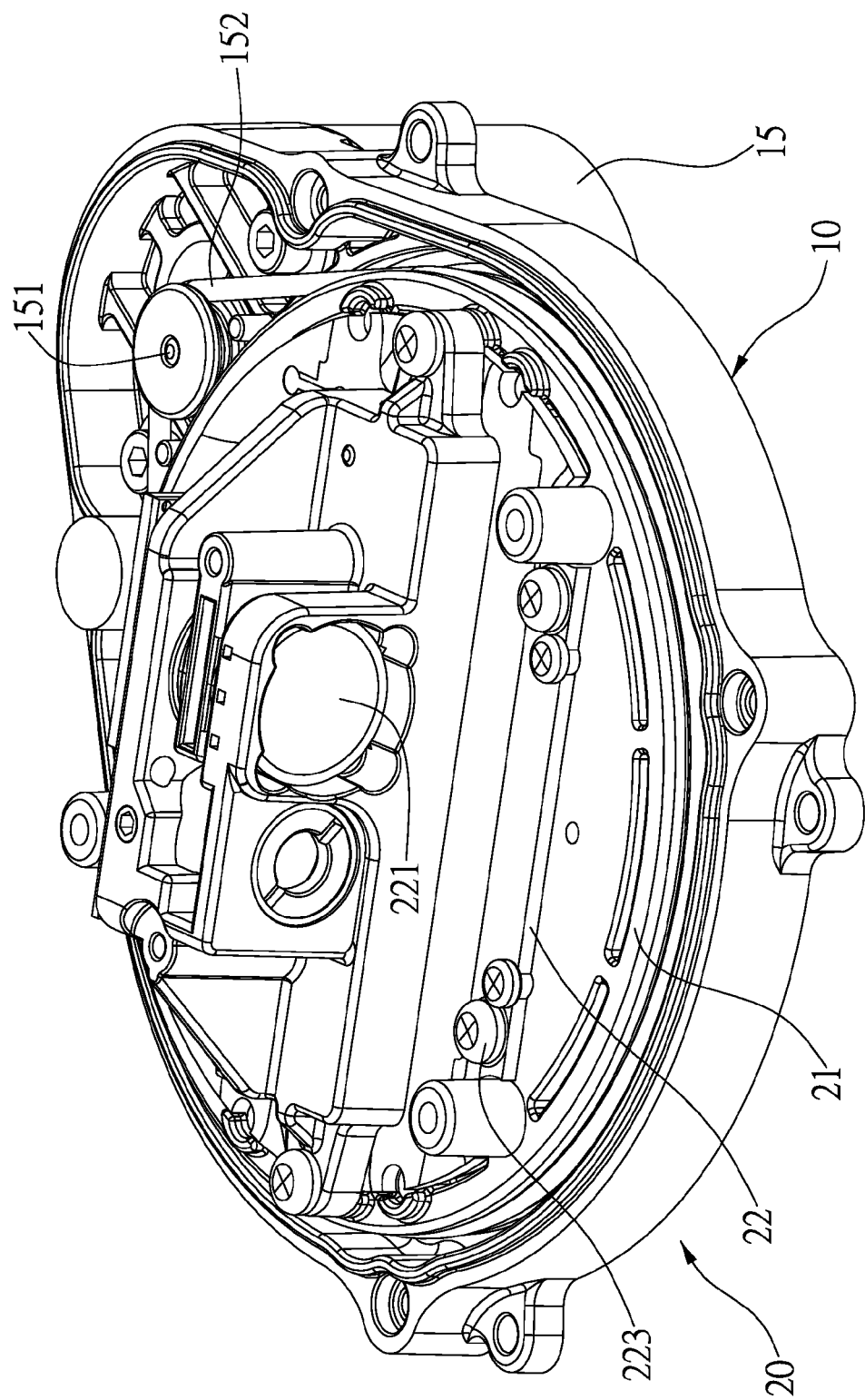
FIG. 1 is a perspective view to show the power supply device for the rotary distance detection device of a robot vacuum cleaner of the present invention.
Figure 2:
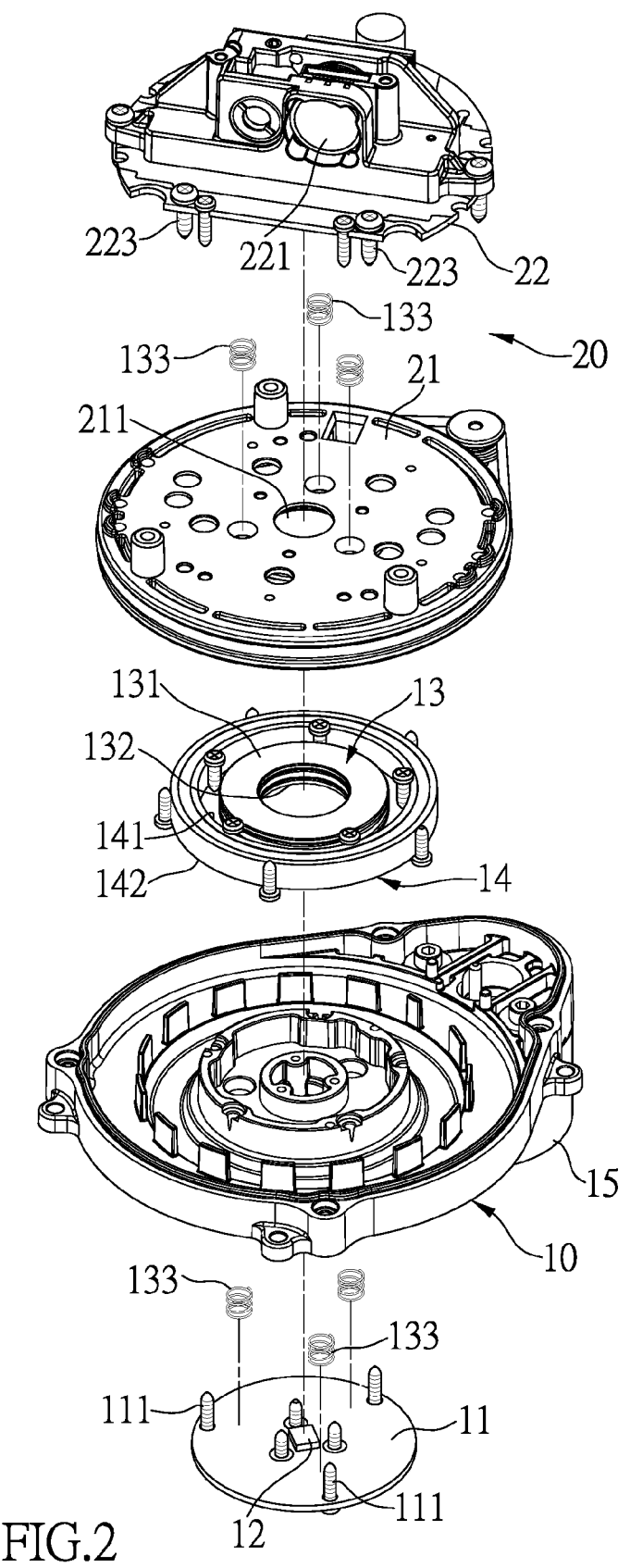
FIG. 2 is an exploded view to show the power supply device for the rotary distance detection device of a robot vacuum cleaner of the present invention.
Figure 3:
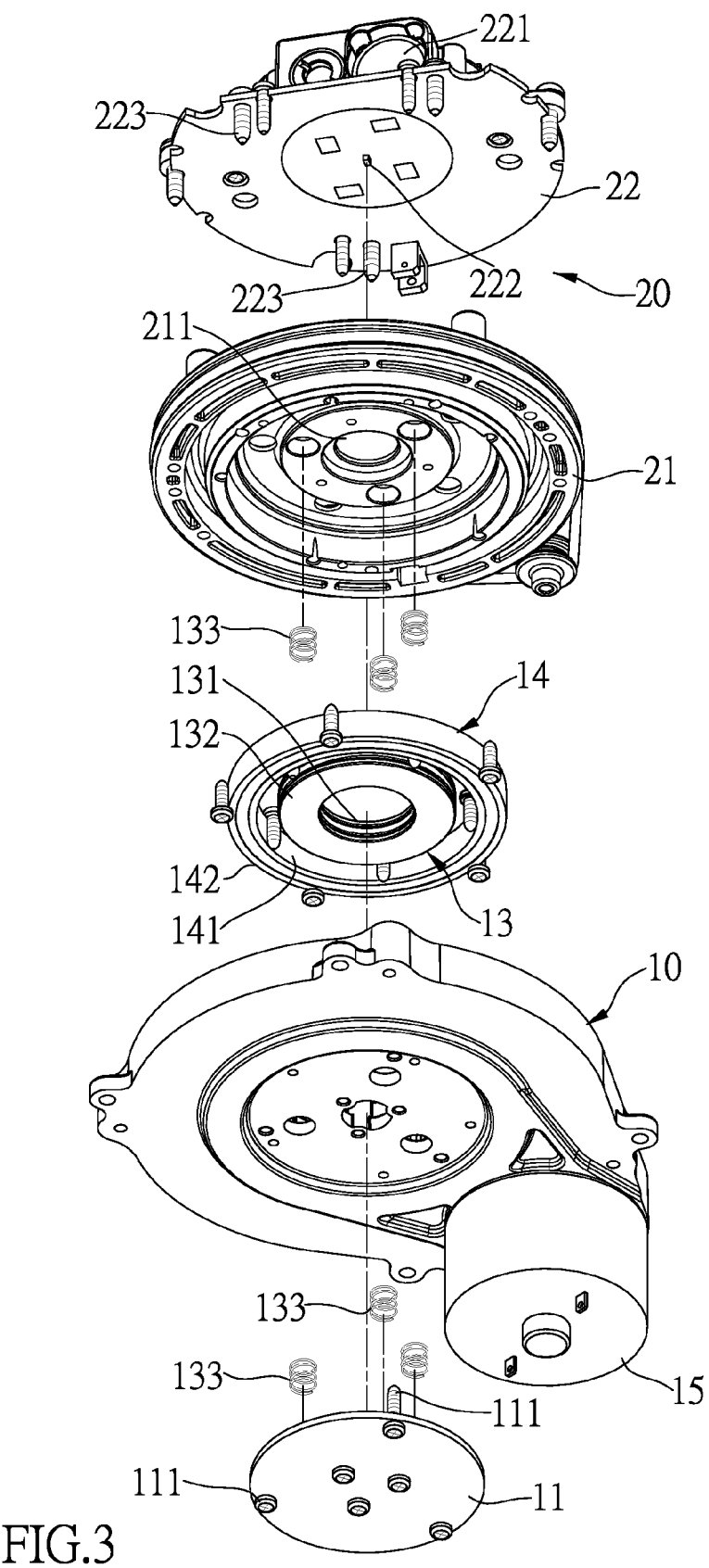
FIG. 3 is another exploded view to show the power supply device for the rotary distance detection device of a robot vacuum cleaner of the present invention.

Referring to FIGS. 1 to 4, the power supply device for the rotary distance detection device of a robot vacuum cleaner of the present invention comprises a base 10 having a control board 11 connected thereto which is electrically connected to a power supply so as to control the base 10 to move and turn. The control board 11 has a receiving member 12, an axial bearing 13 and a radial bearing 14 on the top surface thereof. The axial bearing 13 and the radial bearing 14 are arranged as two rings, and the receiving member 12 is located at the center of the axial bearing 13 and the radial bearing 14. The axial bearing 13 and the radial bearing 14 are respectively connected to a positive pole and a negative pole of the power source.

A rotary distance detection device 20 has a rotary member 21 and a distance-detection circuit board 22, wherein the rotary member 21 connected to the axial and radial bearings 13, 14 so as to be electrically connected with the power source. The rotary member 21 has a hole 211 which is located corresponding to the receiving member 12. The distance-detection circuit board 22 is electrically connected to an optical detection device 221 on the top surface of the distance-detection circuit board 22, and an emitting member 222 on the bottom surface of the distance-detection circuit board 22. The distance-detection circuit board 22 is connected to the top surface of the rotary member 21, wherein the emitting member 222 is located corresponding to the hole 211 and the receiving member 12. The distance-detection circuit board 22 is electrically connected to the axial bearing 13 and the radial bearing 14 so as to provide electric power to the optical detection device 221 and the emitting member 222.

When in operation, the optical detection device 221 rotates on the rotary member 21 and emits beams to obtain distance signals between the objects and the optical detection device 221, and the distance signals are emitted by the emitting member 222 through the hole 211 and received by the receiving member 12. The control board 11 controls the base 10 to move based on the distance signals received by the receiving member 12.

The axial bearing 13 includes a top ring 131 and a bottom ring 132, and multiple balls or cylinders are clamped between the top ring 131 and the bottom ring 132. Multiple spiral springs 133 are connected to the top surface of the axial bearing 13 and the bottom surface of the radial bearing 14. The spiral springs 133 respectively bias the control board 11 and the distance-detection circuit board 22 which is electrically connected to the power supply. In addition, the radial bearing 14 has an inner ring 141 and an outer ring 142 for retaining balls therebetween. The control board 11 has multiple top bolts 111 which are electrically connected to the inner ring 141 or the outer ring 142 of the radial bearing 14. The distance-detection circuit board 22 is connected with multiple bottom bolts 223 which are electrically connected to the inner ring 141 or the outer ring 142 of the radial bearing 14.

The base 10 includes a motor 15 which is electrically connected to the power supply. The motor 15 has a shaft 151 which is cooperated with the belt 152 which is wrapped to the outer periphery of the rotary member 21 so as to drive the rotary member 21.

The distance-detection circuit board 22 is electrically connected to the power supply and the control board 11 via the axial and radial bearings 13, 14. Therefore, the electric power provided to the distance-detection circuit board 22 can be successfully provided without using any wire or battery. The electric power can be provided sufficiently and continuously without worry of frequent replacement.

Figure 4:
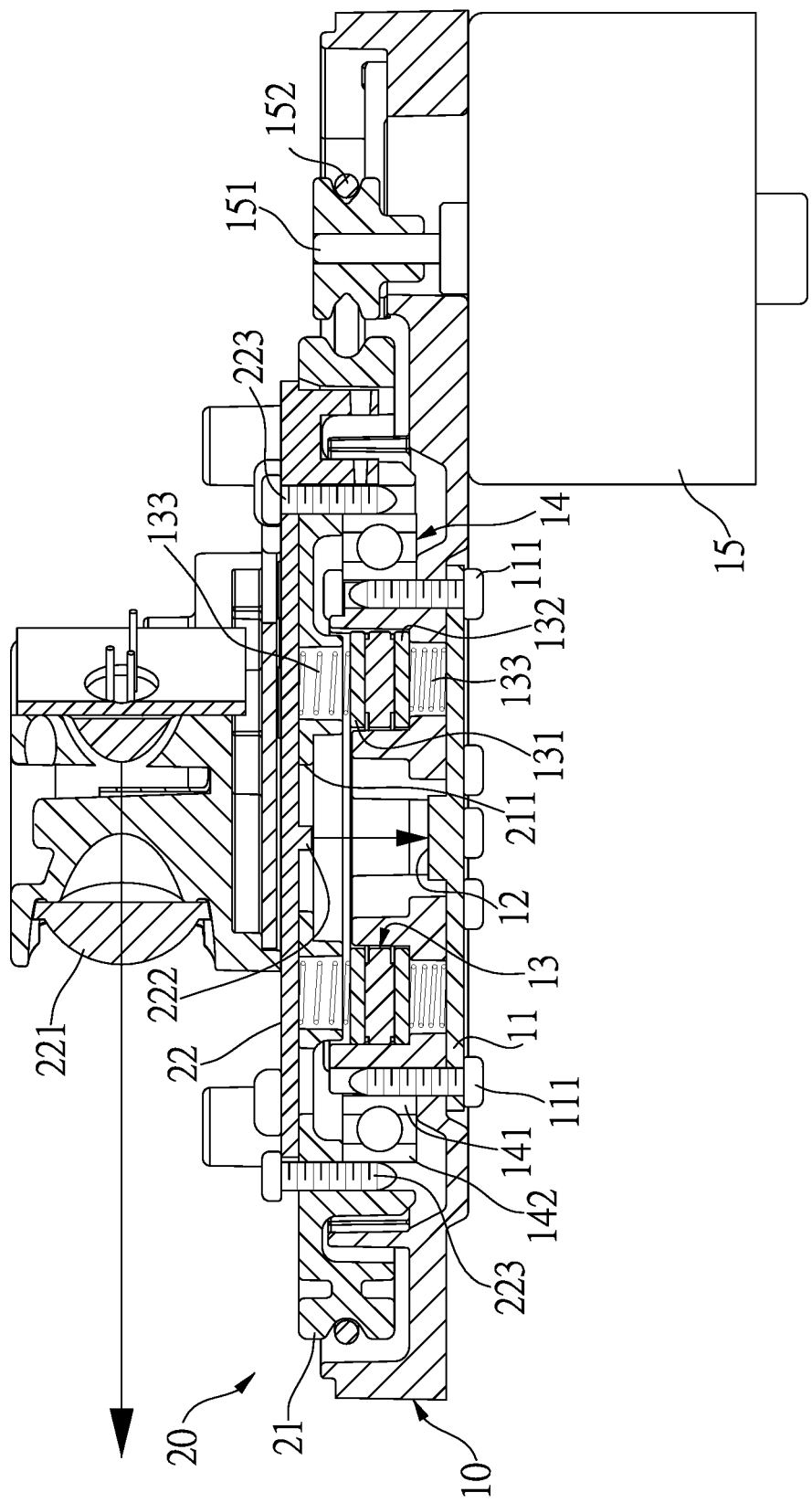
FIG. 4 is a cross sectional view of the power supply device for the rotary distance detection device of a robot vacuum cleaner of the present invention.

As shown in FIG. 4, when the shaft 151 of the motor 15 drives the belt 152 to rotate the rotary member 21, the optical detection device 221 rotates on the rotary member 21 and emits beams to obtain distance signals between the objects and the optical detection device 221, and the distance signals are emitted by the emitting member 222 through the hole 211 and received by the receiving member 12. The control board 11 controls the base 10 to move based on the distance signals received by the receiving member 12.

The axial and radial bearings 13, 14 are respectively connected to the positive pole and the negative pole of the power source, and the rotary member 21 and the distance-detection circuit board 22 are connected to the axial and radial bearings 13, 14 to form a supporting and rotary connection. The distance-detection circuit board 22 is powered via the axial and radial bearings 13, 14. The specific arrangement eliminates the shortcomings of the conventional robot vacuum cleaners.

While we have shown and described the embodiment in accordance with the present invention, it should be clear to those skilled in the art that further embodiments may be made without departing from the scope of the present invention.

What is claimed is:

1. A power supply device for a rotary distance detection device of a robot vacuum cleaner, comprising:
a base having a control board connected thereto which is electrically connected to a power supply, the control board having a receiving member, an axial bearing and a radial bearing on a top surface thereof, the axial bearing and the radial bearing being arranged as two rings, the receiving member located at a center of the axial bearing and the radial bearing, the axial bearing and the radial bearing respectively connected to a positive pole and a negative pole of the power source;
a rotary distance detection device having a rotary member and a distance-detection circuit board, the rotary member connected to the axial and radial bearings, the rotary member having a hole which is located corresponding to the receiving member, the distance-detection circuit board electrically connected to an optical detection device on a top surface of the distance-detection circuit board, and a emitting member on a bottom surface of the distance-detection circuit board, the distance-detection circuit board connected to a top surface of the rotary member, the distance-detection circuit board electrically connected to the axial bearing and the radial bearing so as to provide electric power to the optical detection device and the emitting member, and
the optical detection device rotating on the rotary member and emitting beams to obtain distance signals which are emitted by the emitting member through the hole and received by the receiving member, the control board controlling the base to move based on the distance signals received by the receiving member.

2. The power supply device as claimed in claim 1, wherein the axial bearing includes a top ring and a bottom ring, multiple spiral springs connected to a top surface of the axial bearing and a bottom surface of the radial bearing, the spiral springs respectively bias the control board and the distance-detection circuit board which is electrically connected to the power supply.

3. The power supply device as claimed in claim 1, wherein the radial bearing has an inner ring and an outer ring for retaining bearing balls therebetween, the control board has multiple top bolts which are electrically connected to the inner ring or the outer ring of the radial bearing, the distance-detection circuit board is connected with multiple bottom bolts which are electrically connected to the inner ring or the outer ring of the radial bearing.

4. The power supply device as claimed in claim 2, wherein the radial bearing has an inner ring and an outer ring for retaining bearing balls therebetween, the control board has multiple top bolts which are electrically connected to the inner ring or the outer ring of the radial bearing, the distance-detection circuit board is connected with multiple bottom bolts 223 which are electrically connected to the inner ring or the outer ring of the radial bearing.

5. The power supply device as claimed in claim 1, wherein the base includes a motor which is electrically connected to the power supply, the motor has a shaft which is cooperated with the belt which is wrapped to an outer periphery of the rotary member so as to drive the rotary member.

* * * * *